(12) United States Patent
Tupper

(10) Patent No.: US 8,256,747 B2
(45) Date of Patent: Sep. 4, 2012

(54) CLOSED-LOOP SENSOR TESTER FOR SIMULATING OPEN-AREA RELEASES

(75) Inventor: Kevin J. Tupper, Naples, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1162 days.

(21) Appl. No.: 11/550,741

(22) Filed: Oct. 18, 2006

(65) Prior Publication Data

US 2010/0243066 A1 Sep. 30, 2010

(51) Int. Cl.
*B01D 47/00* (2006.01)

(52) U.S. Cl. ......... 261/19; 261/30; 261/36.1; 261/39.1; 261/42; 422/83; 422/88; 422/98; 422/82; 73/23.2; 73/23.41; 73/23.42; 73/23.34; 73/31.01

(58) Field of Classification Search ........ 261/39.1–39.6, 261/30, 36.1–36.2; 422/83, 88–98; 73/23.2, 73/23.41, 23.42, 23.34, 31.01–31.03
See application file for complete search history.

(56) References Cited

U.S. PATENT DOCUMENTS

| | | | | | |
|---|---|---|---|---|---|
| 4,269,057 | A | * | 5/1981 | Ong et al. | 73/1.03 |
| 5,445,792 | A | * | 8/1995 | Rickloff et al. | 422/28 |
| 5,469,369 | A | * | 11/1995 | Rose-Pehrsson et al. | 702/27 |
| 5,906,794 | A | | 5/1999 | Childers | |
| 6,432,362 | B1 | * | 8/2002 | Shinar et al. | 422/82.01 |
| 6,761,109 | B2 | * | 7/2004 | Newman et al. | 99/516 |
| 6,877,724 | B1 | | 4/2005 | Petty | |
| 2002/0016004 | A1 | * | 2/2002 | Nguyen et al. | 436/39 |
| 2005/0284018 | A1 | | 12/2005 | Yonker | |

* cited by examiner

*Primary Examiner* — In Suk Bullock
*Assistant Examiner* — Robert Eom
(74) *Attorney, Agent, or Firm* — Kaplan Breyer Schwarz & Ottesen LLP

(57) ABSTRACT

A system and method for closed-loop testing of a biological or chemical sensor is disclosed. The tester is fluidically coupled to the input port and exhaust port of a sensor. A mixture of a chemical or biological simulant and air is generated by the tester and is delivered to the sensor. The mixture of simulant and air exiting the sensor is delivered to a collection device.

**18

CLOSED-LOOP SENSOR TESTER FOR SIMULATING OPEN-AREA RELEASES

FIELD OF THE INVENTION

The present invention relates to chemical or biological attack-detection systems and, more particularly, to systems and methods for testing such systems.

BACKGROUND OF THE INVENTION

A chemical or biological attack on a civilian population is a dreadful event. The best response requires the earliest possible detection of the attack so that individuals can flee and civil defense authorities can contain its effects. To this end, chemical and biological attack-detection systems are being deployed in many urban centers.

Once a system has been deployed, routine testing of the system's sensors are required to confirm operational readiness. One way to test such systems is with a broad-area release of chemicals or biological simulants. The simulants are non-pathogenic, non-virulent, or non-toxic stand-ins for the real thing. While far less onerous to the population than the actual chemical or biological agents, the simulants can, nevertheless, adversely affect a small percentage of the population.

As a consequence, there is a need for a system and method that is capable of confirming sensor operation of the attack-detection system without requiring a broad-area release of chemical or biological simulants.

SUMMARY OF THE INVENTION

The present invention provides a system and method for confirming sensor operation without some of the costs and disadvantages of the prior art.

The illustrative embodiment of the invention is a sensor tester that is capable of providing closed-loop testing of a chemical or biological sensor. In some embodiments, the sensor tester comprises a controller, a simulant reservoir, and a collection device.

A conduit delivers simulant from the simulant reservoir to a chamber that is fluidically coupled to a sensor inlet port. An environmental inlet port admits ambient gases, such as air, to the chamber. The simulant and air mix in the chamber, and then flow to the sensor inlet port. After being "sensed" in the sensor, the mixture of simulant and ambient gases exits the sensor and flows to a collection device (e.g., a tank, etc.). The flow of simulant to the sensor and the flow into the collection tank are regulated by control valve. The output from the sensor is evaluated to verify the operational readiness of the sensor.

When testing is completed, the flow of simulant is stopped and, after a clear down period, the control valve leading to the collection device is closed. At this time, a control valve on an environmental outlet port opens, delivering flow, which is simply ambient gases (e.g., air), to the ambient environment. The operation of the control valves is guided by a controller that, among other functions, is capable of time sequencing the opening and closing of control valves to simulate migration of a cloud of simulant.

In this fashion, simulant is not released to the atmosphere, so there is no risk to the general population.

DETAILED DESCRIPTION

Figure 1:
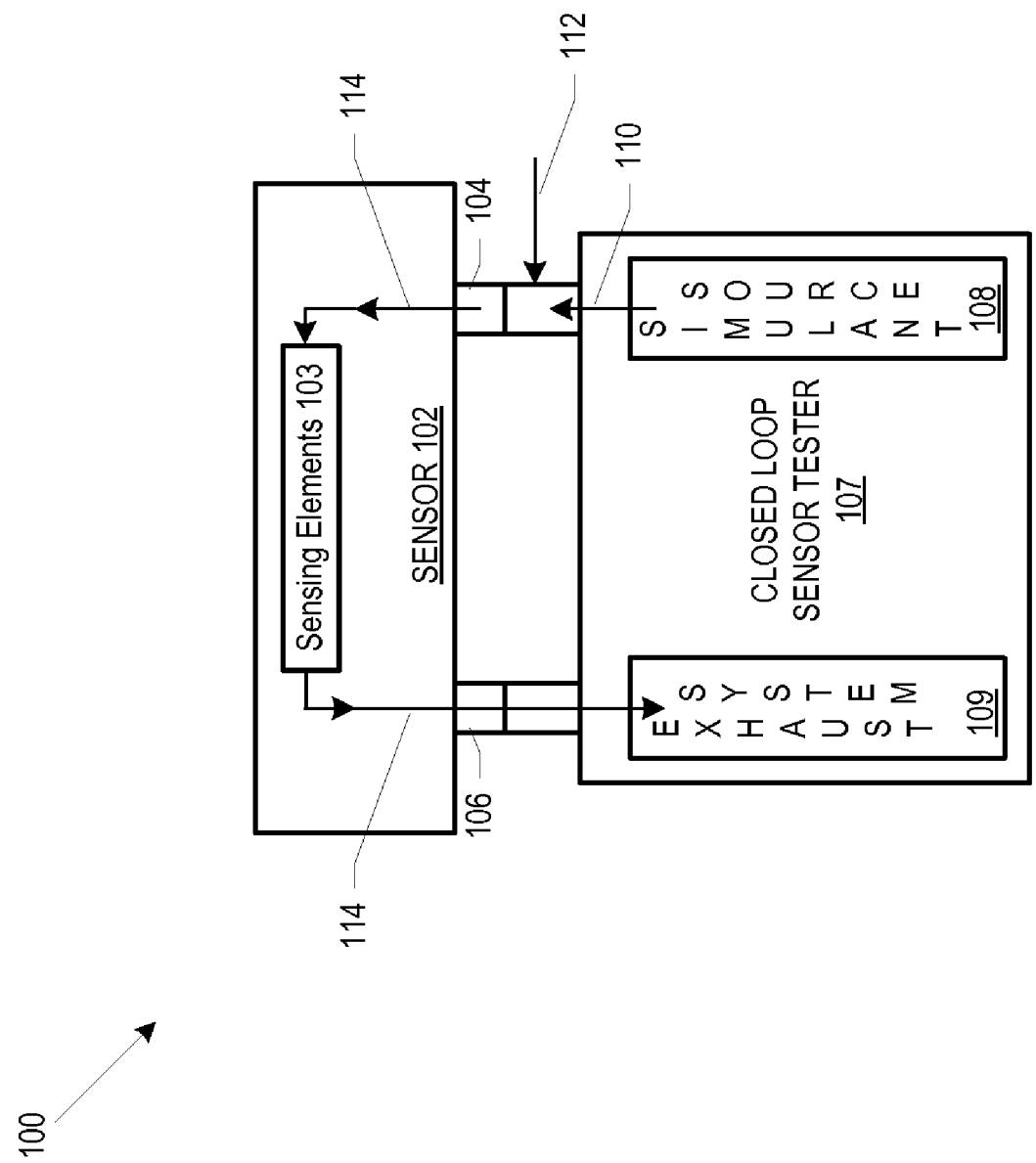
FIG. 1 depicts a block diagram of a sensor tester and sensor in accordance with the illustrative embodiment of the present invention.

FIG. 1 depicts system 100 comprising sensor 102 and sensor tester 107 in accordance with the illustrative embodiment of the present invention. Sensor tester 107 comprises simulant source 108 and exhaust system 109. In the illustrative embodiment, sensor tester 107, simulant source 108 is fluidically coupled to sensor input port 104 and exhaust system 109 is fluidically coupled to sensor exhaust port 106 to provide a closed-loop sensor test system. As used herein, when two elements or regions are described as being "fluidically coupled," it means that fluid (e.g., gas, liquid, suspensions, etc.) is capable of moving between those two elements or regions (in at least one direction).

Simulant source 108 provides a chemical-agent simulant or a biological-agent simulant. The simulants are, of course, relatively benign stand-ins for various harmful chemical and biological agents, as might be used in a chemical or biological attack. More specifically, the simulants are substantially non-pathogenic, non-virulent, or non-toxic.

In the context of the present invention, the purpose of the simulant is to validate operation of sensor 102. As a consequence, the simulant must be detectable by the specific detection method being employed in sensor 102. Those skilled in the art will know how to select a simulant that is appropriate for the type of sensor(s) being tested.

For example, harmful biological agents often fall within a size range of about 1 to 10 microns, which is a size range of particles that can enter the lungs. If particle size is being used as a basis for analysis by the sensor, then benign particles in this size range can be used as a simulant. Furthermore, most biological agents contain compounds such as NADH or flavonoids such as riboflavin that fluoresce under ultra-violet excitation. An ultra-violet laser-induced fluorescence detector utilizes this property to distinguish between biological and non-biological particles by exciting each particle in its biological excitation range and measuring any associated fluorescence. Such detectors are thereby able to distinguish biological particles from common background particles such as dust or dirt. Riboflavin, when taken in the proper concentrations, can be used to simulate biological agents, weak agents, and viral agents.

Chemical Warfare Agents are classified into three groups: blood, blister and nerve agents. Chemical detectors use various technologies to detect these agents such as IMS (Ion Mass Spectrometry) and SAW (Surface Acoustic Wave). Chemicals such as difluoroethane, d-limonene, glycol ethers, and methyl salicylate, when presented to the detectors in known proper concentrations, will cause the detectors to alarm. These chemicals, which are relatively benign at the concentrations of interest, can be used as simulants.

In operation, a flow 110 of simulant is combined with ambient gases 112 (e.g., air, etc.) to form mixture 114. As described further in conjunction with FIG. 2, the flow of simulant is controlled to provide a desired concentration of simulant in air, etc.

Mixture 114 is delivered to sensor input port 104 of sensor 102. The mixture is "sensed" by sensing element 103 of sensor 102 and then delivered to sensor exhaust port 106. Exhaust system 109 of sensor tester 107 receives mixture 114 from sensor exhaust port 106.

Figure 2:
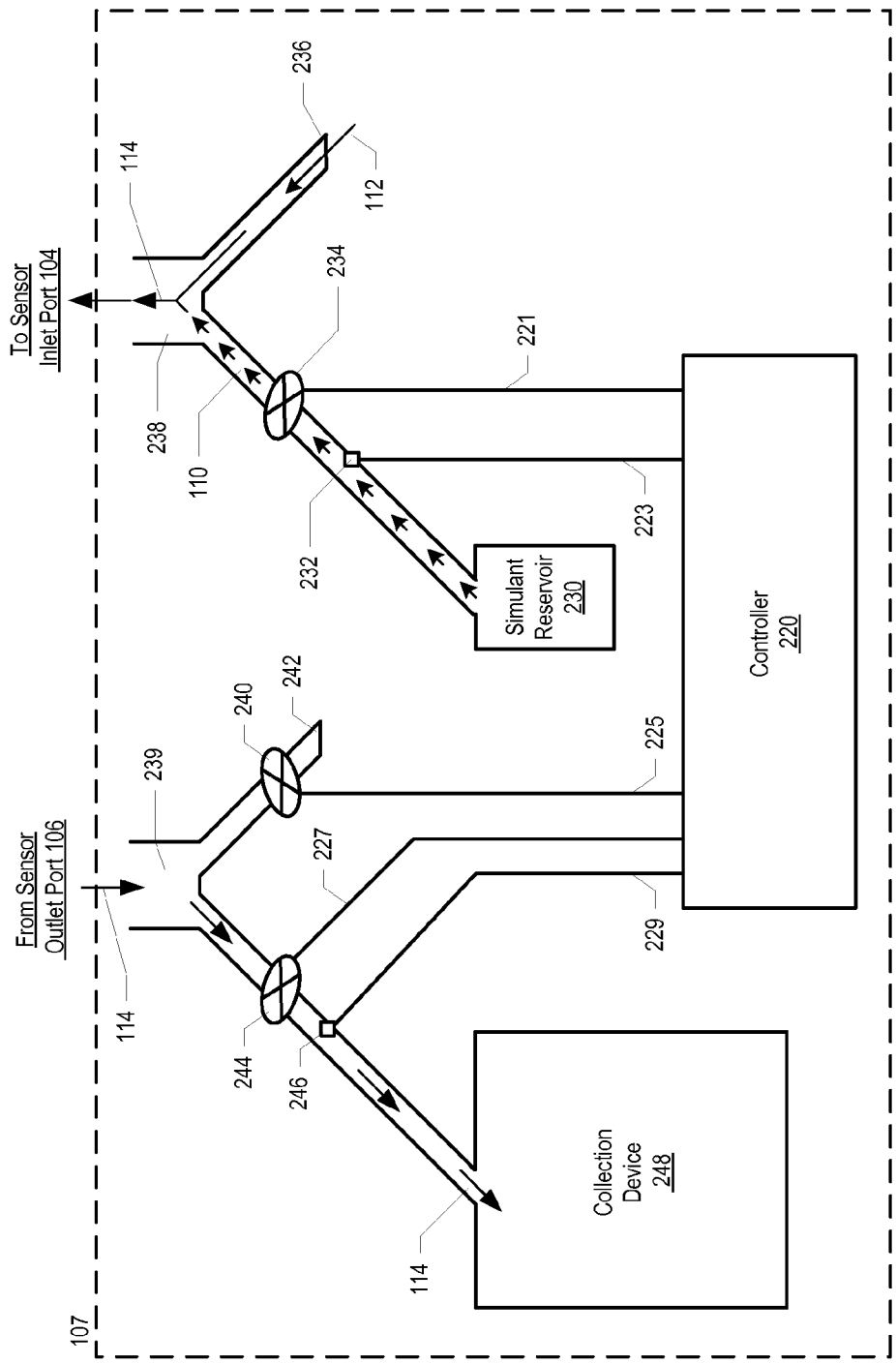
FIG. 2 depicts further detail of the sensor tester.

FIG. 2 depicts further detail of sensor tester 107 in accordance with the illustrative embodiment of the present invention. As depicted in FIG. 2, sensor tester 107 comprises controller 220, simulant reservoir 230, collection device 248, and various ports and control valves.

Simulant reservoir 230 is one embodiment of simulant source 108. In the illustrative embodiment, simulant reservoir 230 is fluidically coupled, through control valve 234 and chamber 238, to sensor inlet port 104. Environmental intake port 236 is open to the ambient environment and is fluidically coupled through chamber 238 to sensor inlet port 104.

As previously disclosed, sensor outlet port 106 of sensor 102 is fluidically coupled to exhaust system 109 of sensor tester 107. In the illustrative embodiment, exhaust system 109 comprises chamber 239, environmental exhaust port 242, collection device 248 and associated control valves. In further detail, chamber 239 is fluidically coupled to sensor outlet port 106. Environmental exhaust port 242 is fluidically coupled to chamber 239 through control valve 240. Likewise, collection device 248 is fluidically coupled to chamber 239 through control valve 244.

Control valves 234, 240, and 244 meter flow responsive to controller 220. In particular, control valve 234 controls flow 110 of simulant from simulant reservoir 230 responsive to a control signal that is carried over control line 221. Control valve 240 controls the flow of ambient gases 112 (e.g., air, etc.) to the environment through environmental outlet port 242 responsive to a control signal this is carried over control line 225. And control valve 244 controls the flow of mixture 114 of ambient gases and simulant into collection device 248 responsive to a control signal that is carried over control line 229.

Local pressure sensors 232 and 246 monitor pressure in simulant reservoir 230 and collection device 248, respectively.

Since the volume of simulant used will be far less than the volume of ambient gases, collection device 248, which is typically a tank, will have a substantially greater volume than simulant reservoir 230. The volume of these containers is dictated by the desired test period and number of test cycles that are to be run prior to recharging the simulant reservoir or emptying the collection device. It is expected that the simulant reservoir will have a size within a range of about one to two ounces and the collection tank will have a size within a range of about 25 to 30 liters.

Controller 220 includes a processor, associated electronics, drivers, etc. Controller 220 is capable of receiving signals from pressure sensors 232 and 246, generating a control signal for control valve 234 to provide a desired amount of flow, and generating control signals to open or close control valves 240 and 244 at a desired time. Controller 240 further provides the logic for time sequencing the opening and closing of control valves 234, 240, and 244 to simulate migration of a cloud of simulant. In general, controller 220 is able to provide the logic and generate the signals required to conduct the operations depicted in FIGS. 3A through 3C, as described below. Those skilled in the art will be able to design, specify, build, and use controller 220.

Figure 3:
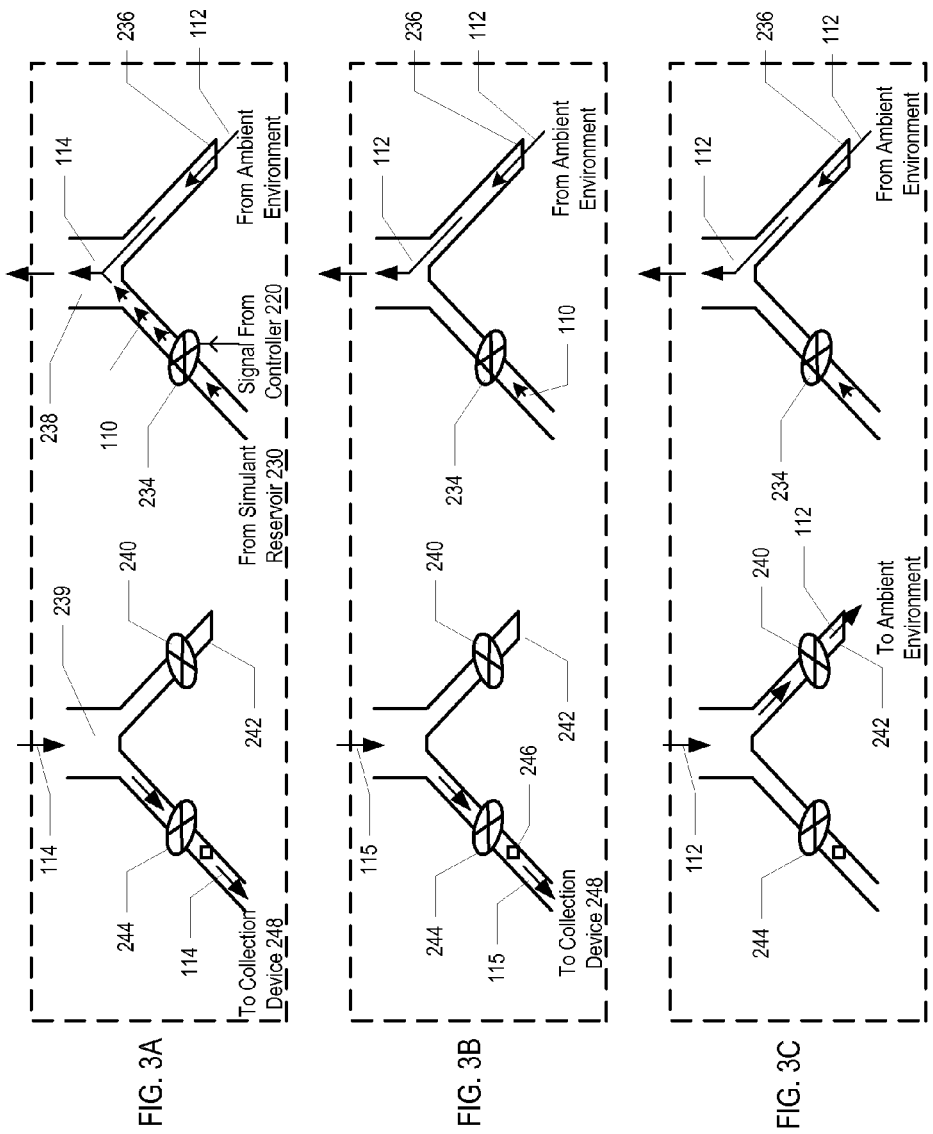
FIGS. 3A-3C depict a method for using the sensor tester of FIG. 2.

The operation of sensor tester 107 is described in conjunction with FIGS. 3A through 3C, which also illustrate a testing method in accordance with the illustrative embodiment of the present invention. For clarity, these Figures depict only a portion of sensor tester 107; in particular, each Figure shows the "inlet 'Y'" and the "outlet 'Y'" and associated control valves.

Referring now to FIG. 3A, controller 220 sends a control signal to control valve 234 to establish a desired amount of flow 110 of simulant toward chamber 238. Ambient gases 112 (e.g., air, etc.) enter environmental intake port 236 and flow toward chamber 238. In chamber 238, simulant and ambient gases mix to form mixture 114.

In some embodiments, the simulant is maintained under pressure in reservoir 230. The pressure serves as the motive force for establishing the flow of simulant. Sensors, such as sensor 102, typically include a pump for drawing in and expelling samples. Ambient gases are drawn into environmental intake port 236 under action of the sensor pump.

Flow 110 of simulant is controlled, in conjunction with pressure readings obtained from pressure sensor 232, to provide a desired concentration of simulant in the ambient gases. The concentration range of interest will typically be between about 1 part per trillion to 10 parts per billion of simulant in mixture 114. Other suitable control strategies, as are known to those skilled in the art, can be used to precisely control flow 110 of simulant from the simulant reservoir.

Mixture 114 enters the sensor through sensor inlet port 104 and is conducted to sensing elements 103 within the sensor. After passing the sensing elements, mixture 114 is directed to sensor outlet port 106. (See, e.g., FIGS. 1 and 2.)

Mixture 114 passes from sensor outlet port 106 to chamber 239. To the extent that closed-loop operation is desired, control valve 240 is closed and control valve 244 is open so that mixture 114 flows to collection device 248. Output from sensor 102 is analyzed to verify operational readiness in known fashion.

After a predetermined period of time, or when pressure readings from pressure sensor 246 indicate that collection device 248 is nearing fluid capacity, control valve 234 is closed to stop flow 110 of simulant, as depicted in FIG. 3B. Ambient gases 112 continue to flow into sensor inlet port 104 and, during a clear-down period, control valve 240 remains closed so that all flow exiting sensor 102 flows to collection device 248. Any residual simulant that remains in sensor 102 is picked up by ambient gases 112 and is exhausted to collection device 248 during the clear-down period. The clear-down period lasts for a period of time in the range of about 30 seconds to five minutes.

At the end of clear down period, control valve 244 closes and control valve 240 is opened, as depicted in FIG. 3C. With the control valve 240 open, ambient gases 112, which are now free of any simulant, flow through environmental outlet port 242 to the ambient environment.

In various embodiments, sensor tester 107 can have any one of a variety of configurations. For example, and without limitation, sensor tester 107 can be configured as:

1) . . . a standalone unit that can be transported from sensor to sensor for testing. The unit, which includes all elements depicted in FIG. 2, can reside on a movable trolley, etc.

2) . . . a partially-integrated, non-transportable system wherein some elements of illustrative sensor tester 107 remain coupled to each sensor (in a system having multiple sensors) and some other elements of sensor tester 107 are common for all sensors and not movable. For example, in some embodiments, the "inlet Y" and its associated control valve remains attached to sensor inlet port 104 of each sensor and "outlet Y" and its associated control valves remain attached to sensor outlet port 106 of each sensor. On the other hand, a single controller 230, simulant reservoir 230 and collection device 248 is used for all sensors.

3) . . . a partially-integrated, transportable system, wherein some elements of the illustrative sensor tester 107 are transported from sensor to sensor for testing and some other elements of sensor tester 107 are common for all sensors and not movable. For example, in some embodiments, the "inlet Y" and its associated control valve, the "outlet Y" and its associated control valves, and controller 220 are moved from sensor to sensor. Simulant reservoir 230 and collection device 248 remain in a fixed position. At each sensor, the "inlet Y" and the "outlet Y" are piped-up to piping that leads to simulant reservoir 230 and collection device 248.

Figure 4:
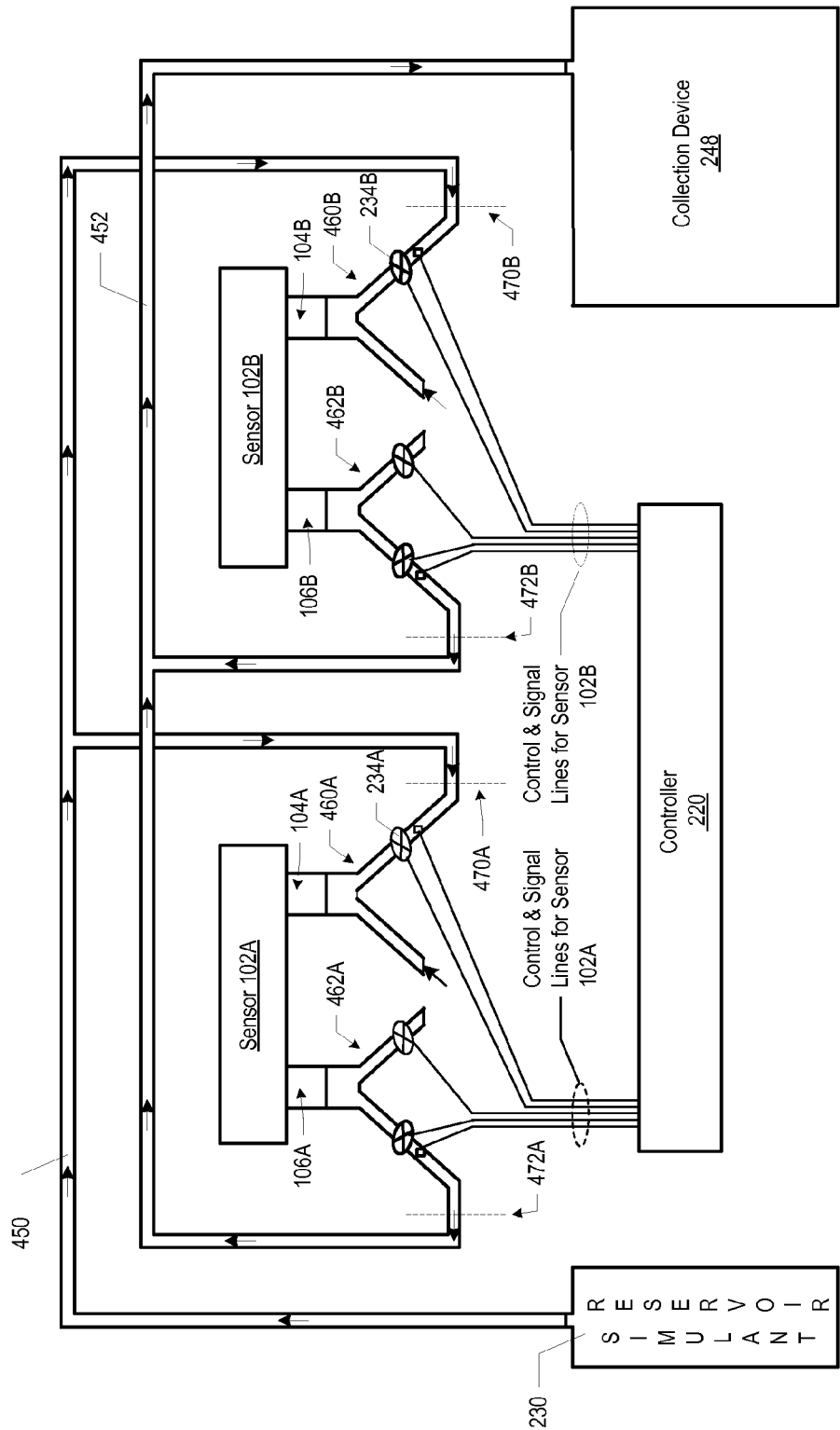
FIG. 4 depicts an alternative embodiment wherein elements of the sensor tester are common for multiple sensors.

Configuration 1 is depicted in FIG. 2. Configuration 2 is depicted in FIG. 4. With reference to FIG. 4, sensor tester 107 includes a single controller 220, a single simulant reservoir 230, and a single collection device 248. Sensor tester 107 further includes inlet Y 460A and outlet Y 462A attached to respective sensor inlet port 104A and sensor outlet port 106A of sensor 102A. Sensor tester 107 also includes inlet Y 460B and outlet Y 462B attached to respective sensor inlet port 104B and sensor outlet port 106B of sensor 102B.

Line 450, which leads from simulant reservoir 230 to each inlet Y 460A and 460B, delivers simulant to each sensor, under the control of control valves 234A and 234B. Line 452 conducts mixture 114 leaving sensor outlet ports 106A and 106B to collection device 230. A first set of control and signal lines lead to the control valves and pressure sensors associated with inlet Y 460A and outlet Y 462A at sensor 102A and a second set of control and signal lines lead to the control valves and pressure sensors associated with inlet Y 460B and outlet Y 462B at sensor 102B.

With continued reference to FIG. 4, sensor testor 107 can be implemented as configuration 3 with minor modifications. In particular, flanges (not depicted) are provided in line 450 at locations 470A and 470B, and in line 452 at locations 472A and 472B. Also, sensor inlet ports 104A, 104B and sensor outlet ports 106A, 106B are flanged. With these modifications, one "inlet Y" and one "outlet Y" can be moved from sensor to sensor by simply flanging them to the sensor inlet and outlet ports. Controller 220 would be a portable unit that would operably couple to the control valves and pressure sensors to provide closed loop testing, in the manner previously described.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising:

a source of a simulant, wherein said simulant is at least one of:

(a) a simulant of a chemical agent, and (b) a simulant of a biological agent, wherein said source is selectively fluidically coupled to an intake port of a sensor capable of detecting at least one of either said chemical agent or said biological agent;

an environmental intake port, wherein said environmental intake port receives gases from an ambient environment, and further wherein said environmental intake port is fluidically coupled to said intake port;

an exhaust system, wherein said exhaust system includes a collection device that is selectively fluidically coupled to an exhaust port of the sensor; and a controller, wherein said controller controls:

(a) a flow of said simulant from said source to said intake port of said sensor; and (b) a flow of said simulant and said gases to said collection device from said exhaust port of said sensor, wherein the collection device receives the simulant and gases and prevents release thereof to both the ambient environment and the sensor.

2. The apparatus of claim 1 wherein said exhaust system further comprises an environmental exhaust port, wherein said environmental exhaust port is selectively fluidically coupled to said exhaust port of said sensor to receive a flow of fluid comprising said gases, and wherein said controller further controls said flow of fluid to said environmental exhaust port.

3. The apparatus of claim 1 wherein said controller is further operable to sequence flow from said source of simulant in a manner that simulates migration of a cloud comprising said chemical agent or said biological agent.

4. The apparatus of claim 1 further comprising a pressure sensor, wherein said pressure sensor is operatively coupled to said collection device to monitor a pressure thereof.

5. The apparatus of claim 1 further comprising a flow sensor, wherein said flow sensor is operatively coupled to said collection device to monitor a flow entering said collection device.

6. The apparatus of claim 1 further comprising a pressure sensor, wherein said pressure sensor is operatively coupled to said source of simulant.

7. The apparatus of claim 1 further comprising a flow control valve for adjusting said flow of said simulant from said source to said intake port of said sensor, wherein said flow control valve adjusts said flow responsive to said controller.

8. The apparatus of claim 1 further comprising a flow control valve for adjusting said flow of said simulant and said gases into said collection device, responsive to said controller.

9. The apparatus of claim 2 further comprising a flow control valve for adjusting said flow of fluid to said environmental exhaust port, responsive to said controller.

10. The apparatus of claim 1 further comprising said sensor.

11. The apparatus of claim 1 further comprising a mixing chamber, wherein simulant from said source thereof mixes within said gases from the ambient environment.

12. A method comprising:
  providing a flow of gases from an ambient environment to a sensor;
  adding a controlled amount of a simulant to said flow of gases thereby forming a mixture, wherein said simulant is selected from the group consisting of a simulant of a chemical agent and a simulant of a biological agent, and wherein addition of said controlled amount of simulant provides a target concentration of said simulant in said mixture;
  sensing said simulant in said sensor;
  collecting said mixture in a collection device after the mixture has been interrogated by the sensor;
  stopping addition of said simulant to said flow of gases;
  preventing said collection device from receiving said mixture or said gases; and
  exhausting said flow of gases to said ambient environment.

13. The method of claim 12 wherein the operation of adding a controlled amount of simulant further comprises sequencing said the addition of simulant to simulate migration of a cloud of comprising said simulant.

14. The method of claim 12 wherein the operation of collecting said mixture in said collection device comprises preventing said mixture from exhausting to said ambient environment.

15. The method of claim 12 wherein the operation of stopping addition of said simulant further comprises monitoring a pressure of said collection device.

16. The method of claim 12 further comprising continuing a flow to said collection device for a limited period of time after addition of said simulant is stopped, wherein continuation of said flow into said collection device occurs before conducting the operation of exhausting said flow of gases to said ambient environment.

17. A method comprising:
  providing a flow of gases from an ambient environment to a sensor;
  adding a controlled amount of a simulant to said flow of gases thereby forming a mixture, wherein said simulant is selected from the group consisting of a simulant of a chemical agent and a simulant of a biological agent, and wherein addition of said controlled amount of simulant provides a target concentration of said simulant in said mixture;
  sensing said simulant in said sensor;
  collecting said mixture in a collection device while preventing the release of any of said mixture to the ambient environment;
  stopping addition of said simulant to said flow of gases while continuing:
  (a) the flow of gases from the ambient environment;
  (b) collecting the flow of gases, and any residual amount of simulant contained therein, in the collection device; and
  when a clear down period elapses, preventing said collection device from receiving any further of said flow of gases and said residual amount of simulant and exhausting the flow of gases and said residual amount of simulant to said ambient environment.

18. A method comprising:
  adding a controlled amount of a simulant to a flow of gases from an ambient environment, thereby forming a first quantity of a mixture, wherein said simulant is selected from the group consisting of a simulant of a chemical agent and a simulant of a biological agent, and wherein addition of said controlled amount of simulant provides a target concentration of said simulant in said mixture;
  flowing the first quantity of the mixture through a sensor that is capable of sensing the simulant;
  collecting the first quantity of the mixture in a collection device; and
  analyzing an output from the sensor to verify operational readiness of the sensor.

* * * * *